US012417738B2

(12) United States Patent
Huangfu et al.

(10) Patent No.: US 12,417,738 B2
(45) Date of Patent: Sep. 16, 2025

(54) PIXEL CIRCUIT, PIXEL DRIVING METHOD, AND DISPLAY DEVICE

(71) Applicant: BOE TECHNOLOGY GROUP CO., LTD., Beijing (CN)

(72) Inventors: Lujiang Huangfu, Beijing (CN); Tuo Sun, Beijing (CN); Jianchao Zhu, Beijing (CN); Li Wang, Beijing (CN); Yu Feng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/557,841

(22) PCT Filed: Feb. 23, 2023

(86) PCT No.: PCT/CN2023/077796
§ 371 (c)(1),
(2) Date: Oct. 27, 2023

(87) PCT Pub. No.: WO2024/174153
PCT Pub. Date: Aug. 29, 2024

(65) Prior Publication Data
US 2025/0087150 A1 Mar. 13, 2025

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ......... G09G 3/3233; G09G 2300/0819; G09G 2300/0842; G09G 2300/0861;
(Continued)

(56) References Cited

U.S. PATENT DOCUMENTS 11,211,010 B2 * 12/2021 Yuan .................. H10K 59/1213
11,631,369 B2 * 4/2023 Lee .......................... G09G 3/32 345/76

(Continued)

FOREIGN PATENT DOCUMENTS

CN 1227638 C 11/2005
CN 101276542 A 10/2008

(Continued)

OTHER PUBLICATIONS

Journal of Display Technology "Driving Schemes for a-Si and LTPS AMOLED Displays" Arokia Nathan, et. al., vol. 1, No. 2, Dec. 2005, 11 Pages.

(Continued)

*Primary Examiner* — Jeff Piziali
(74) *Attorney, Agent, or Firm* — BROOKS KUSHMAN P.C.

(57) ABSTRACT

A pixel circuit, a pixel driving method, and a display device. The pixel circuit includes a light-emitting element, a driving circuit, a compensation control circuit, a light-emitting control circuit and a discharging circuit; the compensation control circuit controls connection or disconnection between the first node and the driving node under the control of the compensation control signal; the light-emitting control circuit controls connection or disconnection between the driving node and the first electrode of the light-emitting element under control of the light-emitting control signal; the discharging circuit is used for generating a discharging current; in a compensation phase, the discharging current terminal is connected to the driving node, and in a light-emitting phase, the discharging current terminal is connected to the driving node and the first electrode of the light-emitting element, and the discharging current terminal is not directly electri- (Continued)

cally connected to the first electrode of the light-emitting element.

20 Claims, 7 Drawing Sheets

(52) U.S. Cl.
CPC . *G09G 2300/0861* (2013.01); *G09G 2310/08* (2013.01); *G09G 2320/0233* (2013.01); *G09G 2330/021* (2013.01)

(58) Field of Classification Search
CPC ....... G09G 2310/08; G09G 2320/0233; G09G 2330/021; G09G 3/32
See application file for complete search history.

(56) References Cited

U.S. PATENT DOCUMENTS

| | | | | |
|---|---|---|---|---|
| 12,211,443 | B2 * | 1/2025 | Zhu | G09G 3/3233 |
| 2003/0112208 | A1 | 6/2003 | Okabe | |
| 2011/0134100 | A1 | 6/2011 | Chung | |
| 2013/0201172 | A1 | 8/2013 | Jeong et al. | |
| 2016/0267843 | A1 | 9/2016 | Wang et al. | |
| 2018/0218674 | A1 | 8/2018 | Ma et al. | |
| 2019/0130830 | A1 * | 5/2019 | Han | G09G 3/3233 |
| 2021/0358408 | A1 | 11/2021 | Zhang et al. | |
| 2022/0093045 | A1 | 3/2022 | Huangfu et al. | |
| 2022/0270549 | A1 | 8/2022 | Xuan et al. | |
| 2023/0031984 | A1 * | 2/2023 | Wang | G09G 3/3233 |
| 2023/0215350 | A1 | 7/2023 | Shi et al. | |
| 2023/0230547 | A1 * | 7/2023 | Yuan | G09G 3/3233 345/108 |

FOREIGN PATENT DOCUMENTS

| | | | |
|---|---|---|---|
| CN | 103000133 | A | 3/2013 |
| CN | 105632403 | A | 6/2016 |
| CN | 206194348 | U | 5/2017 |
| CN | 103247256 | B | 6/2017 |
| CN | 105206221 | B | 6/2018 |
| CN | 108806595 | A | 11/2018 |
| CN | 110232893 | A | 9/2019 |
| CN | 111161674 | A | 5/2020 |
| CN | 112037716 | A | 12/2020 |
| CN | 114300531 | A | 4/2022 |
| CN | 114694572 | A | 7/2022 |
| CN | 114882838 | A | 8/2022 |
| WO | 2015141773 | A1 | 9/2015 |

OTHER PUBLICATIONS

Journal of Display Technology Statistical Model for Simulating the Effect of LTPS TFT Device Variation for SOP Applications Ya-Hsiang Tai, et al., vol. 3, No. 4, Dec. 2007, 8 Pages.

* cited by examiner

PIXEL CIRCUIT, PIXEL DRIVING METHOD, AND DISPLAY DEVICE

CROSS-REFERENCE TO RELATED APPLICATION

This application is the U.S. national phase of PCT Application No. PCT/CN2023/077796 filed on Feb. 23, 2023, which is incorporated herein by reference in its entirety.

TECHNICAL FIELD

The present disclosure relates to the technical field of displays, and more particularly, to a pixel circuit, a pixel driving method, and a display device.

BACKGROUND

In the related art, when the related components fabricated using the LTPS (low temperature polysilicon) process form a small current bypass discharging channel, the discharging current does not match the corresponding components in the driving transistor, affecting the low gray drive uniformity and related display quality.

SUMMARY

In an aspect, an embodiment of the present disclosure provides a pixel circuit, including a light-emitting element, a driving circuit, a compensation control circuit, a light-emitting control circuit and a discharging circuit;

a control terminal of the driving circuit is electrically connected to a first node, a first terminal of the driving circuit is electrically connected to a power supply voltage terminal, a second terminal of the driving circuit is electrically connected to a driving node, and the driving circuit is used for controlling generation of a driving current under control of a potential of the first node;

the compensation control circuit is electrically connected to a compensation control terminal, the first node and the driving node for controlling connection or disconnection between the first node and the driving node under control of a compensation control signal provided by the compensation control terminal;

the light-emitting control circuit is electrically connected to a light-emitting control terminal, the driving node and a first electrode of the light-emitting element for controlling connection or disconnection between the driving node and the first electrode of the light-emitting element under control of a light-emitting control signal provided by the light-emitting control terminal; a second electrode of the light-emitting element is electrically connected to a first voltage terminal;

the discharging circuit is used for generating a discharging current and providing the discharging current through a discharging current terminal;

in a compensation phase, the discharging current terminal is connected to the driving node, and in a light-emitting phase, the discharging current terminal is connected to the driving node and the first electrode of the light-emitting element, and the discharging current terminal is not directly electrically connected to the first electrode of the light-emitting element.

Optionally, the discharging current terminal is electrically connected to the driving node.

Optionally, the light-emitting control circuit comprises a first control sub-circuit and a second control sub-circuit; the light-emitting control terminal comprises a first light-emitting control terminal and a second light-emitting control terminal;

the first control sub-circuit is electrically connected to the first light-emitting control terminal, and an intermediate node is electrically connected to the first electrode of the light-emitting element for controlling connection or disconnection between the intermediate node and the first electrode of the light-emitting element under control of a first light-emitting control signal provided by the first light-emitting control terminal;

the second control sub-circuit is electrically connected to a second light-emitting control terminal, the driving node and the intermediate node for controlling connection or disconnection between the driving node and the intermediate node under control of a second light-emitting control signal provided by the second light-emitting control terminal;

the discharging current terminal is electrically connected to the intermediate node.

Optionally, the first control sub-circuit is used for controlling connection between the driving node and the intermediate node under control of the first light-emitting control signal provided by the first light-emitting control terminal in the compensation phase and the light-emitting phase;

the second control sub-circuit is used for controlling, in the compensation phase, disconnection between the intermediate node and the first electrode of the light-emitting element under control of the second light-emitting control signal provided at the second light-emitting control terminal, and controlling, in the light-emitting phase, connection between the intermediate node and the first electrode of the light-emitting element at the control terminal of the second light-emitting control signal.

Optionally, the discharging circuit comprises a discharging transistor;

a gate electrode of the discharging transistor and a first electrode of the discharging transistor are both electrically connected to the discharging current terminal, and a second electrode of the discharging transistor is electrically connected to a second voltage terminal.

Optionally, the discharging circuit comprises a discharging transistor;

a gate electrode of the discharging transistor is electrically connected to a discharging control terminal, a first electrode of the discharging transistor is electrically connected to the discharging current terminal, and a second electrode of the discharging transistor is electrically connected to a second voltage terminal.

Optionally, the light-emitting control circuit comprises a first light-emitting control transistor;

a gate electrode of the first light-emitting control transistor is electrically connected to the light-emitting control terminal, a first electrode of the first light-emitting control transistor is electrically connected to the driving node, and a second electrode of the first light-emitting control transistor is electrically connected to the first electrode of the light-emitting element.

Optionally, the first light-emitting control transistor is an oxide transistor.

Optionally, the first control sub-circuit comprises a first light-emitting control transistor, and the second control sub-circuit comprises a second light-emitting control transistor;

a gate electrode of the first light-emitting control transistor is electrically connected to the first light-emitting control terminal, a first electrode of the first light-emitting control transistor is electrically connected to the intermediate node, and a second electrode of the first light-emitting control transistor is electrically connected to the first electrode of the light-emitting element;

a gate electrode of the second light-emitting control transistor is electrically connected to a second light-emitting control terminal, a first electrode of the second light-emitting control transistor is electrically connected to the driving node, and a second electrode of the second light-emitting control transistor is electrically connected to the intermediate node.

Optionally, the first light-emitting control transistor and the second light-emitting control transistor are oxide transistors.

Optionally, the driving circuit comprises a driving transistor, and the compensation control circuit comprises a first transistor;

a gate electrode of the driving transistor is electrically connected to the first node, a first electrode of the driving transistor is electrically connected to the power supply voltage terminal, and a second electrode of the driving transistor is electrically connected to the driving node;

a gate electrode of the first transistor is electrically connected to the compensation control terminal, a first electrode of the first transistor is electrically connected to the first node, and a second electrode of the first transistor is electrically connected to the driving node.

Optionally, the first transistor is an oxide transistor.

Optionally, in at least one embodiment of the present disclosure, the pixel circuit further includes a storage circuit;

a first terminal of the storage circuit is electrically connected to the first node, and a second terminal of the storage circuit is electrically connected to a second node.

Optionally, in at least one embodiment of the present disclosure, the pixel circuit further includes a data writing circuit, a first reset circuit, a second reset circuit and a third reset circuit;

the data writing circuit is electrically connected to a writing control terminal, a data line and the second node for writing a data voltage on the data line into the second node under control of a writing control signal provided by the writing control terminal;

the first reset circuit is electrically connected to a first reset control terminal, a reference voltage terminal and the second node for writing a reference voltage provided by the reference voltage terminal into the second node under control of a first reset control signal provided by the first reset control terminal;

the second reset circuit is electrically connected to a second reset control terminal, the reference voltage terminal and the second node for writing the reference voltage into the second node under control of a second reset control signal provided by the second reset control terminal;

the third reset circuit is electrically connected to a third reset control terminal, an initial voltage terminal and the first node for writing an initial voltage provided by the initial voltage terminal into the first node under control of a third reset control signal provided by the third reset control terminal.

Optionally, the storage circuit comprises a storage capacitor, the first reset circuit comprises a second transistor, the second reset circuit comprises a third transistor, the third reset circuit comprises a fourth transistor, and the data writing circuit comprises a fifth transistor;

a first terminal of the storage capacitor is electrically connected to the first node, and a second terminal of the storage capacitor is electrically connected to the second node;

a gate electrode of the second transistor is electrically connected to the first reset control terminal, a first electrode of the second transistor is electrically connected to the reference voltage terminal, and a second electrode of the second transistor is electrically connected to the second node;

a gate electrode of the third transistor is electrically connected to the second reset control terminal, a first electrode of the third transistor is electrically connected to the reference voltage terminal, and a second electrode of the third transistor is electrically connected to the second node;

a gate electrode of the fourth transistor is electrically connected to the third reset control terminal, a first electrode of the fourth transistor is electrically connected to the initial voltage terminal, and a second electrode of the fourth transistor is electrically connected to the first node;

a gate electrode of the fifth transistor is electrically connected to the writing control terminal, a first electrode of the fifth transistor is electrically connected to the data line, and a second electrode of the fifth transistor is electrically connected to the second node.

Optionally, in at least one embodiment of the present disclosure, the pixel circuit further includes a data writing circuit, a first reset circuit and a third reset circuit;

the data writing circuit is electrically connected to a writing control terminal, a data line and the second node for writing a data voltage on the data line into the second node under control of a writing control signal provided by the writing control terminal;

the first reset circuit is electrically connected to a first reset control terminal, a reference voltage terminal and the second node for writing a reference voltage provided by the reference voltage terminal into the second node under control of a first reset control signal provided by the first reset control terminal;

the third reset circuit is electrically connected to a third reset control terminal, an initial voltage terminal and the first node for writing an initial voltage provided by the initial voltage terminal into the first node under control of a third reset control signal provided by the third reset control terminal.

Optionally, the storage circuit comprises a storage capacitor, the first reset circuit comprises a second transistor, the third reset circuit comprises a fourth transistor, and the data writing circuit comprises a fifth transistor;

a first terminal of the storage capacitor is electrically connected to the first node, and a second terminal of the storage capacitor is electrically connected to the second node;

a gate electrode of the second transistor is electrically connected to the first reset control terminal, a first electrode of the second transistor is electrically connected to the reference voltage terminal, and a second electrode of the second transistor is electrically connected to the second node;

a gate electrode of the fourth transistor is electrically connected to the third reset control terminal, a first electrode of the fourth transistor is electrically connected to the initial voltage terminal, and a second electrode of the fourth transistor is electrically connected to the first node;

a gate electrode of the fifth transistor is electrically connected to the writing control terminal, a first electrode of the fifth transistor is electrically connected to the data line, and a second electrode of the fifth transistor is electrically connected to the second node.

In a second aspect, an embodiment of the present disclosure provides a pixel driving method, applied to the pixel circuit as described above, wherein a display cycle comprises a compensation phase and a light-emitting phase which are arranged successively; the pixel driving method comprises:

in the compensation phase, the discharging circuit generates the discharging current and provides the discharging current through the discharging current terminal, and the compensation control circuit controls connection between the first node and the driving node under the control of the compensation control signal, and the discharging current terminal is connected to the driving node; and in the light-emitting phase, the discharging circuit generates the discharging current and provides the discharging current through the discharging current terminal, wherein the discharging current terminal is connected to the driving node and the first electrode of the light-emitting element, the light-emitting control circuit controls connection between the driving node and the first electrode of the light-emitting element under control of the light-emitting control signal, and the driving circuit controls generation of the driving current for driving the light-emitting element under control of the potential of the first node.

Optionally, the pixel circuit further comprises a data writing circuit, a first reset circuit, a second reset circuit and a third reset circuit; the display cycle further comprises a reset phase arranged before the compensation phase, and the pixel driving method further comprises:

in the reset phase, the first reset circuit writes the reference voltage provided by the reference voltage terminal into the second node under control of the first reset control signal; the third reset circuit writes the initial voltage provided by the initial voltage terminal into the first node under control of the third reset control signal;

in the compensation phase, the data writing circuit writes the data voltage on the data line into the second node under control of the writing control signal;

in the light-emitting phase, the second reset circuit writes the reference voltage to the second node under control of the second reset control signal.

Optionally, the pixel circuit further comprises a data writing circuit, a first reset circuit and a third reset circuit; the display cycle further comprises a reset phase arranged before the compensation phase, and the pixel driving method further comprises:

in the reset phase, the first reset circuit writes the reference voltage provided by the reference voltage terminal into the second node under control of the first reset control signal; the third reset circuit writes the initial voltage provided by the initial voltage terminal into the first node under control of the third reset control signal;

in the compensation phase, the data writing circuit writes the data voltage on the data line into the second node under control of the writing control signal;

in the light-emitting phase, the first reset circuit writes the reference voltage to the second node under control of the first reset control signal.

In a third aspect, an embodiment of the present disclosure provides a display device including the pixel circuit as described above.

DETAILED DESCRIPTION

Figure 1:
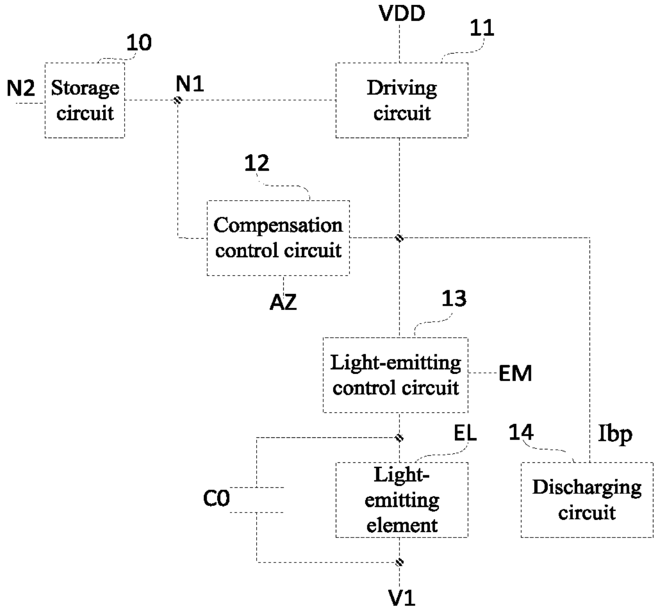
FIG. 1 is a structure diagram of a pixel circuit according to at least one embodiment of the present disclosure.

The embodiments of the present disclosure will now be described more fully hereinafter with reference to the accompanying drawings, in which some, but not all embodiments of the disclosure are shown. Based on the embodiments in the present disclosure, all other embodiments obtained by a person of ordinary skill in the art without inventive effort fall within the scope of the present disclosure.

The transistors used in all the embodiments of the present disclosure may be thin film transistors or field effect transistors, or other devices with the same characteristics. In embodiments of the present disclosure, to distinguish the two electrodes of a transistor other than the gate electrode, one of the electrodes is referred to as a first electrode while the other one is referred to as a second electrode.

In practical operation, when the transistor is a thin film transistor or a field effect transistor, the first electrode may be the drain, and the second electrode may be the source; alternatively, the first electrode may the source, and the second electrode may be the drain.

A pixel circuit according to an embodiment of the present disclosure comprises a light-emitting element, a driving circuit, a compensation control circuit, a light-emitting control circuit and a discharging circuit;

a control terminal of the driving circuit is electrically connected to a first node, a first terminal of the driving circuit is electrically connected to a power supply voltage terminal, a second terminal of the driving circuit is electrically connected to a driving node, and the driving circuit is used for controlling generation of a driving current under control of a potential of the first node;

the compensation control circuit is electrically connected to a compensation control terminal, the first node and the driving node for controlling connection or disconnection between the first node and the driving node under control of a compensation control signal provided by the compensation control terminal;

the light-emitting control circuit is electrically connected to a light-emitting control terminal, the driving node and a first electrode of the light-emitting element for controlling connection or disconnection between the driving node and the first electrode of the light-emitting element under control of a light-emitting control signal provided by the light-emitting control terminal; a second electrode of the light-emitting element is electrically connected to a first voltage terminal;

the discharging circuit is used for generating a discharging current and providing the discharging current through a discharging current terminal;

in a compensation phase, the discharging current terminal is connected to the driving node, and in a light-emitting phase, the discharging current terminal is connected to the driving node and the first electrode of the light-emitting element, and the discharging current terminal is not directly electrically connected to the first electrode of the light-emitting element.

When the pixel circuit according to an embodiment of the present disclosure is in operation, a discharging circuit generates a discharging current, and during a compensation phase, the compensation control circuit controls the connection between the first node and the driving node under the control of the compensation control signal, a discharging current terminal is in connection with the driving node, and the discharging circuit provides the discharging current to the driving node via the discharging current terminal, so that at the terminal of the compensation process, the potential of the first node is related to the discharging current, and when the threshold voltage of the driving transistor in the driving circuit is detected, acquiring, in the form of an additional voltage increment, a gate-source voltage increment corresponding to a of an additional voltage increment; during a light-emitting phase, the light-emitting control circuit controls connection between the driving node and the first electrode of the light-emitting element under the control of the light-emitting control signal; and an uncontrolled current portion related to the characteristics of the driving transistor generated by the driving circuit can be cancelled with the discharging current, so that during the light-emitting phase, the light-emitting brightness of the light-emitting element is not affected by the uncontrolled current portion.

The pixel circuit described in the embodiments of the present disclosure is to cope with the problem that the discharging current does not match with the corresponding component in the driving transistor when the relevant components using the LTPS (low temperature polycrystalline silicon) process constitute a small current bypass leakage channel. Although the specific circuit proposal is to realize the matching of the fixed discharging current spatial variability compensation and the uncontrolled component in the driving current, the idea of realizing the matching of the discharging current spatial variability compensation is also applicable to the scheme of driving signal-determinant leakage according to a certain proportion of the driving current.

When the pixel circuit according to the embodiment of the present disclosure is in operation, in a compensation phase, when a drain electrode of a driving transistor included in the driving circuit is connected to a bypass discharging channel to generate a discharging current, using a threshold voltage compensation mechanism of the pixel circuit, matching a residual current containing an uncontrolled leakage component in an output current of the driving transistor with the discharging current in a light-emitting phase can be achieved, and this matching relationship can not only offset components such as the uncontrolled leakage and the like which are not interfered when the driving transistor outputs a small driving current when displaying with a low grayscale; it is also possible to ensure that the target current component for driving the light-emitting element in the output current of the driving transistor is not affected by the variability of the discharging current.

Optionally, the discharging current terminal is electrically connected to the driving node.

In at least one embodiment of the present disclosure, the pixel circuit may further include a storage circuit having a first terminal electrically connected to the first node and a second terminal electrically connected to the second node.

As shown in FIG. 1, a pixel circuit according to at least one embodiment of the present disclosure comprises a light-emitting element EL, a driving circuit 11, a compensation control circuit 12, a light-emitting control circuit 13, a discharging circuit 14 and a storage circuit 10;

a control terminal of the driving circuit 11 is electrically connected to a first node N1, a first terminal of the driving circuit 11 is electrically connected to a power supply voltage terminal VDD, and a second terminal of the driving circuit 11 is electrically connected to a driving node, and the driving circuit 11 is used for controlling the generation of a driving current under the control of the potential of the first node N1;

the compensation control circuit 12 is respectively electrically connected to a compensation control terminal AZ, the first node N1 and the driving node for controlling the connection or disconnection between the first node N1 and the driving node under the control of a compensation control signal provided by the compensation control terminal AZ;

the light-emitting control circuit 13 is electrically connected to a light-emitting control terminal EM, the driving node and a first electrode of the light-emitting element EL, respectively, for controlling the connection or disconnection between the driving node and the first electrode of the light-emitting element EL under the control of a light-emitting control signal provided by the light-emitting control terminal EM; A second electrode of the light-emitting element EL is electrically connected to a first voltage terminal V1;

the discharging circuit 14 is used for generating a discharging current Ibp and providing the discharging current Ibp via a discharging current terminal;

the discharging current terminal is electrically connected to the driving node;

a first terminal of the storage circuit 10 is electrically connected to a first node N1, and a second terminal of the storage circuit 10 is electrically connected to a second node N2.

In FIG. 1, reference numeral CO denotes the junction capacitance of the light-emitting element.

In at least one embodiment of the present disclosure, the first voltage terminal V1 may be a low voltage terminal or a ground terminal, but is not limited thereto.

When the pixel circuit of at least one embodiment of the present disclosure as shown in FIG. 1 is in operation, at the terminal of the driving of the previous frame, the light-emitting control circuit 13, under the control of the light-emitting control signal, controls the driving node to be disconnected before the first electrode of the light-emitting element EL, and relies on the charge stored in the junction capacitor CO to maintain light emission for a period of time; the brightness is displayed according to different targets, and the junction voltage and brightness of a light-emitting element gradually decrease to different degrees, and in the case of a low grayscale, the junction voltage and brightness decrease slowly;

a display cycle (the display cycle can be a frame display time) comprises a compensation phase and a light-emitting phase which are arranged successively;

in the compensation phase, under the control of a compensation control signal, the compensation control circuit 12 controls the connection between the first node N1 and the driving node so that a driving transistor comprised in the driving circuit 11 is in a diode connection state; the discharging circuit 14 is used for generating a discharging current Ibp and providing the discharging current Ibp via a discharging current terminal, and the discharging current terminal is electrically connected to the driving node; a power supply voltage Vdd provided by a power supply voltage terminal VDD charges the storage circuit 10 via the driving transistor, and the potential of the first node N1 gradually increases; ids (Ids is the drain-source current flowing through the driving transistor) gradually decreases; when Ids is equal to the discharging current Ibp, the charging process terminals; since the driving transistor still has a residual current I0, the potential Vn1 of the first node N1 is not strictly equal to Vdd+Vth; since I0 is small, Vn1 is still close to Vth, and Vth is the threshold voltage of the driving transistor; according to the characteristics of the driving transistor:

$$Ids = K \times (Vgs - Vth)^2;$$

where K is a current coefficient of a driving transistor, and Vgs is a gate-source voltage of the driving transistor;

in the case where Vgs is equal to Vdd+Vth, Taylor expansion can be performed on the above equation, ignoring higher-order terms;

$$Ids = 2K(Vgs - Vth);$$

ideally, at the terminal of the charging process, the residual current I0 is equal to Ibp, then:

Vn1 is approximately equal to Vth+Ibp/2K;

where the additional term Ibp/2K is a voltage increment related to a discharging current Ibp acquired in the compensation phase, and it needs to be explained that the discharging current Ibp of the bypass discharge channel needs to be greater than the uncontrollable leakage part determined by the device characteristics of the driving transistor, so as to ensure that I0 covers these components;

in the compensation phase, a second node N2 accesses a data voltage Vdt; in a light-emitting phase, the second node N2 accesses a reference voltage Vref; a voltage jump amplitude δVn2=Vref−Vdt of the second node N2 is coupled to a first node N1 by a storage circuit 10, and is superimposed with a potential Vn1 of the first node N1 at the terminal of the compensation phase to form a gate-source voltage Vgs of a driving transistor; at this moment, at this moment, ids is approximately equal to 2K×(δVn2+Vn1−Vth), and Ids is equal to 2K×δVn2+Ibp;

Wherein 2K×δVn2 is a target driving current component controlled by the Vdt, the residual current I0 is equal to Ibp, and I0 contains an uncontrolled current component related to the characteristics of the driving transistor; when the driving transistor drives the light-emitting element to emit light, this part of the uncontrolled current is exactly equal to the discharging current Ibp, and is discharged by the bypass discharge channel; and only the target driving current component 2K×δVn2 controlled by the Vdt drives the light-emitting element to emit light, especially when the driving transistor outputs a small driving current in a low grey-scale display, so that the driving current is not interfered by components such as an uncontrolled leakage current.

In at least one embodiment of the present disclosure, the drain current of the driving transistor is larger than the current required for the actual display when the pixel circuit is operated to perform the low-grayscale display, resulting in inaccuracy of the low-grayscale display, so that the at least one embodiment can drive the light-emitting element to emit light during the light-emitting phase by using a discharging current having a current value larger than an uncontrolled current portion related to the characteristics of the driving transistor during the compensation phase and the light-emitting phase, so that only the target driving current component 2K×δVn2 controlled by the Vdt during the light-emitting phase.

In at least one embodiment of the present disclosure, the light-emitting element may be an OLED (organic light-emitting diode), and the first electrode of the light-emitting element is an anode and the second electrode of the light-emitting element is a cathode, but not limited thereto.

In at least one embodiment of the present disclosure, the discharging current Ibp needs to be greater than the characteristic-determinant uncontrolled current portion of the driving transistor, and to reduce power consumption, the discharging current may be less than 1/100 of the maximum operating current of the driving transistor.

In at least one embodiment of the present disclosure, the light-emitting control circuit comprises a first control sub-circuit and a second control sub-circuit; the light-emitting control terminal comprises a first light-emitting control terminal and a second light-emitting control terminal;

the first control sub-circuit is electrically connected to the first light-emitting control terminal, and an intermediate node is electrically connected to the first electrode of the light-emitting element for controlling connection or disconnection between the intermediate node and the first electrode of the light-emitting element under control of a first light-emitting control signal provided by the first light-emitting control terminal;

the second control sub-circuit is electrically connected to a second light-emitting control terminal, the driving node and the intermediate node for controlling connection or disconnection between the driving node and the intermediate node under control of a second light-emitting control signal provided by the second light-emitting control terminal;

the discharging current terminal is electrically connected to the intermediate node.

In at least one embodiment of the present disclosure, the first control sub-circuit is used for controlling connection between the driving node and the intermediate node under control of the first light-emitting control signal provided by the first light-emitting control terminal in the compensation phase and the light-emitting phase;

the second control sub-circuit is used for controlling, in the compensation phase, disconnection between the intermediate node and the first electrode of the light-emitting element under control of the second light-emitting control signal provided at the second light-emitting control terminal, and controlling, in the light-emitting phase, connection between the intermediate node and the first electrode of the light-emitting element at the control terminal of the second light-emitting control signal.

Figure 2:
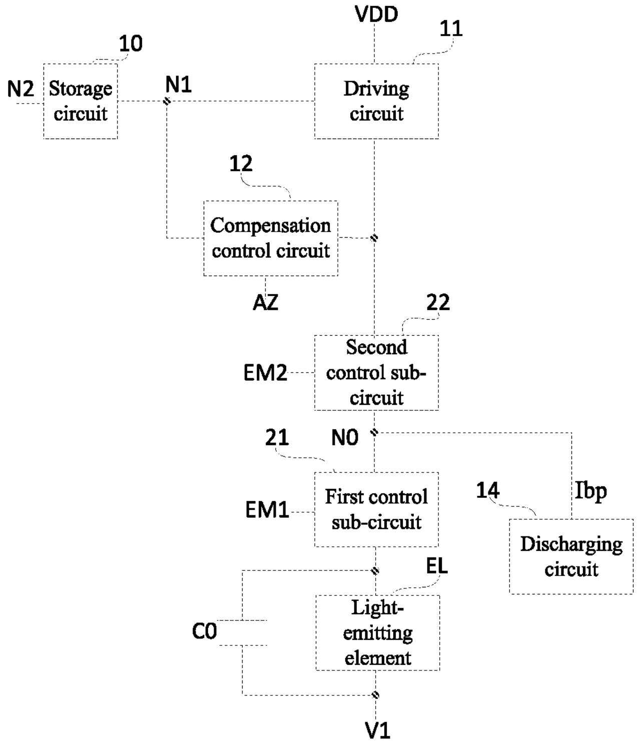
FIG. 2 is a structure diagram of a pixel circuit according to at least one embodiment of the present disclosure.

As shown in FIG. 2, the pixel circuit according to at least one embodiment of the present disclosure comprises a light-emitting element EL, a driving circuit 11, a compensation control circuit 12, a light-emitting control circuit, a discharging circuit 14 and a storage circuit 10;

a control terminal of the driving circuit 11 is electrically connected to a first node N1, a first terminal of the driving circuit 11 is electrically connected to a power supply voltage terminal VDD, and a second terminal of the driving circuit 11 is electrically connected to a driving node, and the driving circuit 11 is used for controlling the generation of a driving current under the control of the potential of the first node N1;

the compensation control circuit 12 is respectively electrically connected to a compensation control terminal AZ, the first node N1 and the driving node for controlling the connection or disconnection between the first node N1 and the driving node under the control of a compensation control signal provided by the compensation control terminal AZ;

the discharging circuit 14 is used for generating a discharging current Ibp and providing the discharging current Ibp via a discharging current terminal;

the light-emitting control circuit comprises a first control sub-circuit 21 and a second control sub-circuit 22; the light-emitting control terminal comprises a first light-emitting control terminal EM1 and a second light-emitting control terminal EM2;

the first control sub-circuit 21 is respectively electrically connected to the first light-emitting control terminal EM1, and the intermediate node NO is electrically connected to the first electrode of the light-emitting element EL for controlling the connection and disconnection between the intermediate node NO and the first electrode of the light-emitting element EL under the control of the first light-emitting control signal provided by the first light-emitting control terminal EM1;

the second control sub-circuit 22 is respectively electrically connected to a second light-emitting control terminal EM2, the driving node and an intermediate node NO for controlling the connection or disconnection between the driving node and the intermediate node NO under the control of a second light-emitting control signal provided by the second light-emitting control terminal EM2;

the discharging current terminal is electrically connected to the intermediate node NO.

When the pixel circuit of at least one embodiment of the present disclosure as shown in FIG. 2 is in operation, in the compensation phase, the first control sub-circuit 21 controls the intermediate node NO to be disconnected from the first electrode of the light-emitting element EL under the control of the first light-emitting control signal, and the second control sub-circuit 22 controls the connection between the driving node and the intermediate node NO under the control of the second light-emitting control signal, so that the discharging current terminal is connected to the driving node;

in the light-emitting phase, the first control sub-circuit 21 controls the intermediate node NO to communicate with the first electrode of the light-emitting element EL under the control of the first light-emitting control signal, and the second control sub-circuit 22 controls the driving node to communicate with the intermediate node NO to communicate with the first electrode of the light-emitting element EL under the control of the second light-emitting control signal.

Optionally, the discharging circuit comprises a discharging transistor;

a gate electrode of the discharging transistor and a first electrode of the discharging transistor are both electrically connected to the discharging current terminal, and a second electrode of the discharging transistor is electrically connected to a second voltage terminal.

In at least one embodiment of the present disclosure, the voltage value of the second voltage signal provided by the second voltage terminal may be 5V-7V less than the voltage value of the power supply voltage provided by the power supply voltage terminal, but is not limited thereto.

Optionally, the discharging circuit comprises a discharging transistor;

a gate electrode of the discharging transistor is electrically connected to a discharging control terminal, a first electrode of the discharging transistor is electrically connected to the discharging current terminal, and a second electrode of the discharging transistor is electrically connected to a second voltage terminal.

Optionally, the light-emitting control circuit comprises a first light-emitting control transistor;

a gate electrode of the first light-emitting control transistor is electrically connected to the light-emitting control terminal, a first electrode of the first light-emitting control transistor is electrically connected to the driving node, and a second electrode of the first light-emitting control transistor is electrically connected to the first electrode of the light-emitting element.

In at least one embodiment of the present disclosure, the first light-emitting control transistor is an oxide transistor to reduce leakage.

Optionally, the first control sub-circuit comprises a first light-emitting control transistor and the second control sub-circuit comprises a second light-emitting control transistor;

a gate electrode of the first light-emitting control transistor is electrically connected to the first light-emitting control terminal, a first electrode of the first light-emitting control transistor is electrically connected to the intermediate node, and a second electrode of the first light-emitting control transistor is electrically connected to the first electrode of the light-emitting element;

a gate electrode of the second light-emitting control transistor is electrically connected to a second light-emitting control terminal, a first electrode of the second light-emitting control transistor is electrically connected to the driving node, and a second electrode of the second light-emitting control transistor is electrically connected to the intermediate node.

In at least one embodiment of the present disclosure, the first light-emitting control transistor and the second light-emitting control transistor are oxide transistors to reduce leakage.

Optionally, the driving circuit comprises a driving transistor, and the compensation control circuit comprises a first transistor;

a gate electrode of the driving transistor is electrically connected to the first node, a first electrode of the driving transistor is electrically connected to the power supply voltage terminal, and a second electrode of the driving transistor is electrically connected to the driving node;

a gate electrode of the first transistor is electrically connected to the compensation control terminal, a first electrode of the first transistor is electrically connected to the first node, and a second electrode of the first transistor is electrically connected to the driving node.

In at least one embodiment of the present disclosure, the first transistor is an oxide transistor to reduce leakage.

The pixel circuit according to at least one embodiment of the present disclosure further comprises a data writing circuit, a first reset circuit, a second reset circuit and a third reset circuit;

the data writing circuit is electrically connected to a writing control terminal, a data line and the second node for writing a data voltage on the data line into the second node under control of a writing control signal provided by the writing control terminal;

the first reset circuit is electrically connected to a first reset control terminal, a reference voltage terminal and the second node for writing a reference voltage provided by the reference voltage terminal into the second node under control of a first reset control signal provided by the first reset control terminal;

the second reset circuit is electrically connected to a second reset control terminal, the reference voltage terminal and the second node for writing the reference voltage into the second node under control of a second reset control signal provided by the second reset control terminal;

the third reset circuit is electrically connected to a third reset control terminal, an initial voltage terminal and the first node for writing an initial voltage provided by the initial voltage terminal into the first node under control of a third reset control signal provided by the third reset control terminal.

Figure 3:
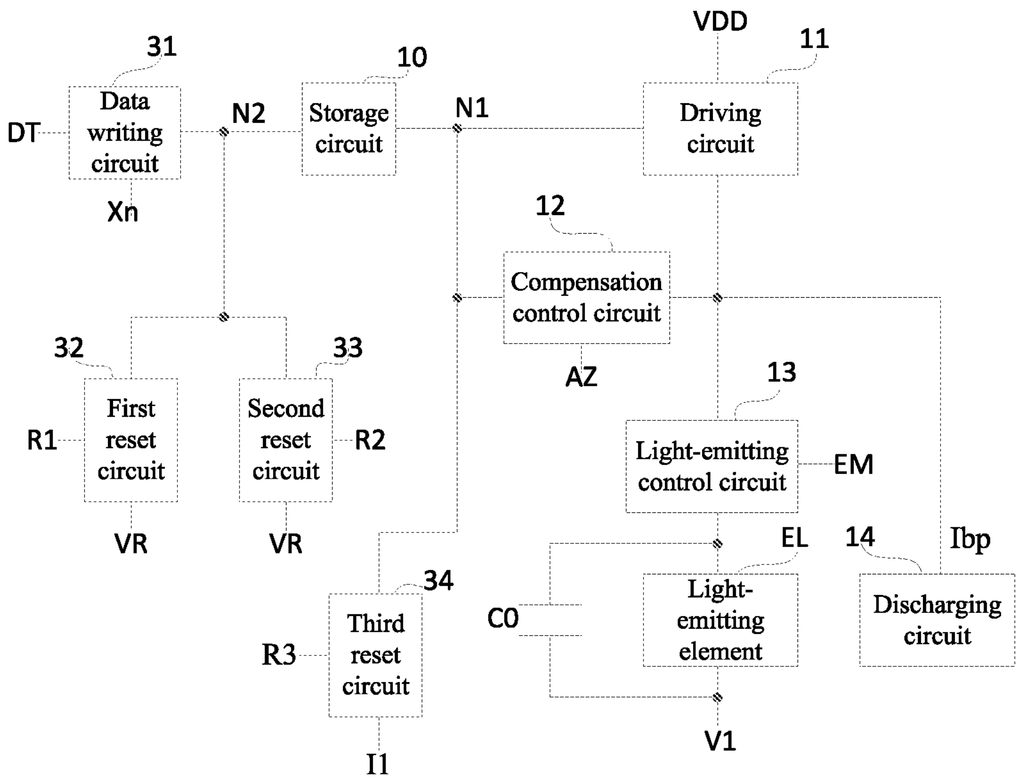
FIG. 3 is a structure diagram of a pixel circuit according to at least one embodiment of the present disclosure.

As shown in FIG. 3, on the basis of the at least one embodiment of the pixel circuit shown in FIG. 1, the pixel circuit according to the at least one embodiment of the present disclosure further comprises a data writing circuit 31, a first reset circuit 32, a second reset circuit 33 and a third reset circuit 34;

the data writing circuit 31 is electrically connected to the writing control terminal Xn, the data line DT and the second node N2 respectively, and is used for writing the data voltage Vdt on the data line DT into the second node N2 under the control of the writing control signal provided by the writing control terminal Xn;

the first reset circuit 32 is respectively electrically connected to the first reset control terminal R1, the reference voltage terminal VR and the second node N2 for writing the reference voltage Vref provided by the reference voltage terminal VR into the second node N2 under the control of the first reset control signal provided by the first reset control terminal R1;

the second reset circuit 33 is respectively electrically connected to a second reset control terminal R2, a reference voltage terminal VR and the second node N2 for writing the reference voltage Vref into the second node N2 under the control of a second reset control signal provided by the second reset control terminal R2;

the third reset circuit 34 is electrically connected to the third reset control terminal R3, the initial voltage terminal I1 and the first node N1, respectively, for writing the initial voltage Vinit provided by the initial voltage terminal I1 into the first node N1 under the control of the third reset control signal provided by the third reset control terminal R3.

In operation of at least one embodiment of the pixel circuit shown in FIG. 3 of the present disclosure, the display cycle may include a reset phase, a compensation phase, and a light-emitting phase arranged sequentially;

in a reset phase, the first reset circuit 32 writes a reference voltage Vref provided by a reference voltage terminal VR into the second node N2 under the control of a first reset control signal; the third reset circuit 34 writes the initial voltage Vinit provided by the initial voltage terminal I1 into the first node N1 under the control of the third reset control signal;

in a compensation phase, the data writing circuit 31 writes a data voltage Vdt on a data line DT into the second node N2 under the control of a writing control signal provided by the writing control terminal Xn, and the compensation control circuit controls the connection between the first node N1 and the driving node under the control of the compensation control signal;

in a light-emitting phase, the second reset circuit 33 writes the reference voltage Vref into the second node N2 under the control of the second reset control signal, and the light-emitting control circuit 13 controls connection between the driving node and a first electrode of the light-emitting element EL under the control of the light-emitting control signal; the driving circuit 11 drives the light-emitting element EL to emit light.

Figure 4:
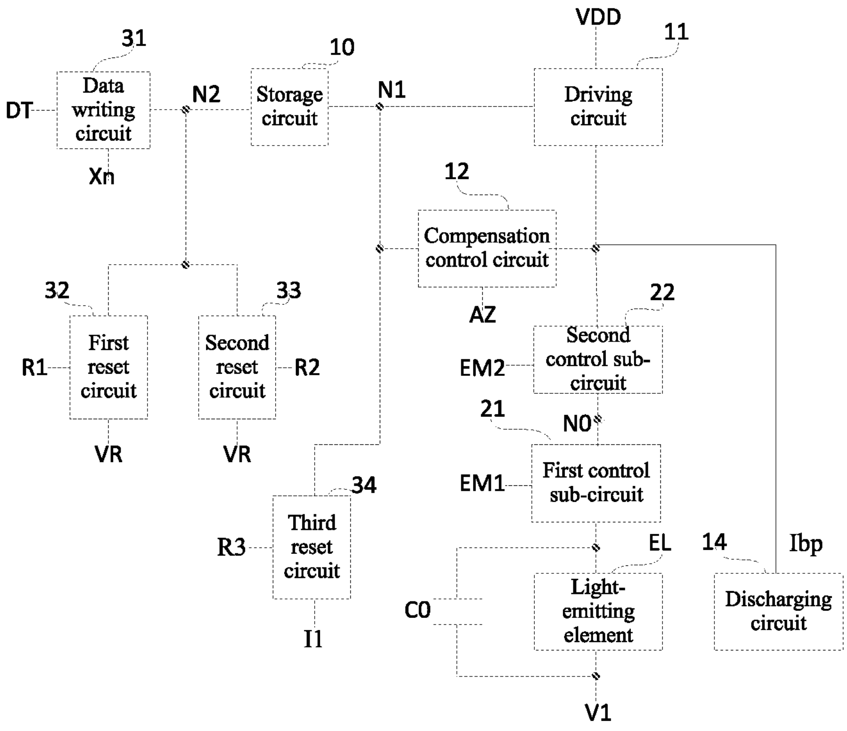
FIG. 4 is a structure diagram of a pixel circuit according to at least one embodiment of the present disclosure.

As shown in FIG. 4, on the basis of the at least one embodiment of the pixel circuit shown in FIG. 2, the pixel circuit according to the at least one embodiment of the present disclosure further comprises a data writing circuit 31, a first reset circuit 32, a second reset circuit 33 and a third reset circuit 34;

the data writing circuit 31 is electrically connected to the writing control terminal Xn, the data line DT and the second node N2 respectively, and is used for writing the data voltage Vdt on the data line DT into the second node N2 under the control of the writing control signal provided by the writing control terminal Xn;

the first reset circuit 32 is respectively electrically connected to the first reset control terminal R1, the reference voltage terminal VR and the second node N2 for writing the reference voltage Vref provided by the reference voltage terminal VR into the second node N2 under the control of the first reset control signal provided by the first reset control terminal R1;

the second reset circuit 33 is respectively electrically connected to a second reset control terminal R2, a reference voltage terminal VR and the second node N2 for writing the reference voltage Vref into the second node N2 under the control of the second reset control signal;

the third reset circuit 34 is electrically connected to the third reset control terminal R3, the initial voltage terminal I1 and the first node N1, respectively, for writing the initial voltage Vinit provided by the initial voltage terminal I1 into the first node N1 under the control of the third reset control signal.

In operation of at least one embodiment of the pixel circuit of the present disclosure as shown in FIG. 4, the display cycle may comprise a reset phase, a compensation phase and a light-emitting phase which are arranged successively.

in a reset phase, the first reset circuit 32 writes a reference voltage Vref provided by a reference voltage terminal VR into the second node N2 under the control of a first reset control signal; the third reset circuit 34 writes the initial voltage Vinit provided by the initial voltage terminal I1 into the first node N1 under the control of the third reset control signal;

in a compensation phase, the data writing circuit 31 writes a data voltage Vdt on a data line DT into the second node N2 under the control of a writing control signal provided by the writing control terminal Xn, and the compensation control circuit 12 controls the connection between the first node N1 and the driving node under the control of the compensation control signal; a first control sub-circuit 21, under the control of a first light-emitting control signal, controls an intermediate node NO to be disconnected from a first electrode of a light-emitting element EL, and a second control sub-circuit 22, under the control of a second light-emitting control signal, controls the connection between the driving node and the intermediate node NO, so that the discharging current terminal is connected to the driving node;

in a light-emitting phase, the second reset circuit 33 writes the reference voltage Vref into the second node N2 under the control of the second reset control signal, the first control sub-circuit 21 controls the intermediate node NO to communicate with the first electrode of the light-emitting element EL under the control of the first light-emitting control signal, and the second control sub-circuit 22 controls the connection between the driving node and the intermediate node NO to enable the connection between the driving node and the first electrode of the light-emitting element EL under the control of the second light-emitting control signal; the driving circuit 11 drives the light-emitting element EL to emit light.

Optionally, the storage circuit comprises a storage capacitor, the first reset circuit comprises a second transistor, the second reset circuit comprises a third transistor, the third reset circuit comprises a fourth transistor, and the data writing circuit comprises a fifth transistor;

a first terminal of the storage capacitor is electrically connected to the first node, and a second terminal of the storage capacitor is electrically connected to the second node;

a gate electrode of the second transistor is electrically connected to the first reset control terminal, a first electrode of the second transistor is electrically connected to the reference voltage terminal, and a second electrode of the second transistor is electrically connected to the second node;

a gate electrode of the third transistor is electrically connected to the second reset control terminal, a first electrode of the third transistor is electrically connected to the reference voltage terminal, and a second electrode of the third transistor is electrically connected to the second node;

a gate electrode of the fourth transistor is electrically connected to the third reset control terminal, a first electrode of the fourth transistor is electrically connected to the initial voltage terminal, and a second electrode of the fourth transistor is electrically connected to the first node;

a gate electrode of the fifth transistor is electrically connected to the writing control terminal, a first electrode of the fifth transistor is electrically connected to the data line, and a second electrode of the fifth transistor is electrically connected to the second node.

The pixel circuit of at least one embodiment of the present disclosure further includes a data writing circuit, a first reset circuit, and a third reset circuit;

the data writing circuit is electrically connected to a writing control terminal, a data line and the second node for writing a data voltage on the data line into the second node under control of a writing control signal provided by the writing control terminal;

the first reset circuit is electrically connected to a first reset control terminal, a reference voltage terminal and the second node for writing a reference voltage provided by the reference voltage terminal into the second node under control of a first reset control signal provided by the first reset control terminal;

the third reset circuit is electrically connected to a third reset control terminal, an initial voltage terminal and the first node for writing an initial voltage provided by the initial voltage terminal into the first node under control of a third reset control signal provided by the third reset control terminal.

Optionally, the storage circuit comprises a storage capacitor, the first reset circuit comprises a second transistor, the third reset circuit comprises a fourth transistor, and the data writing circuit comprises a fifth transistor;

a first terminal of the storage capacitor is electrically connected to the first node, and a second terminal of the storage capacitor is electrically connected to the second node;

a gate electrode of the second transistor is electrically connected to the first reset control terminal, a first electrode of the second transistor is electrically connected to the reference voltage terminal, and a second electrode of the second transistor is electrically connected to the second node;

a gate electrode of the fourth transistor is electrically connected to the third reset control terminal, a first electrode of the fourth transistor is electrically connected to the initial voltage terminal, and a second electrode of the fourth transistor is electrically connected to the first node;

a gate electrode of the fifth transistor is electrically connected to the writing control terminal, a first electrode of the fifth transistor is electrically connected to the data line, and a second electrode of the fifth transistor is electrically connected to the second node.

Figure 5:
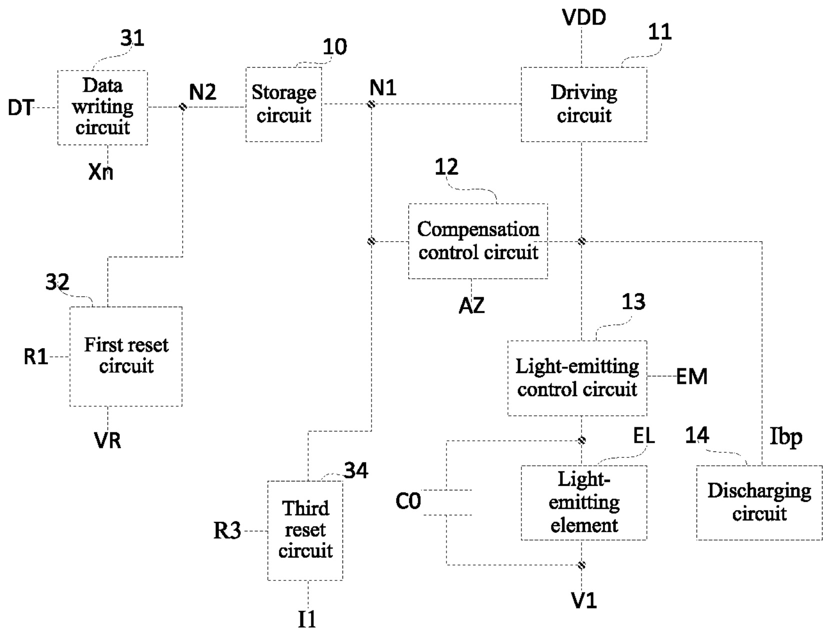
FIG. 5 is a structure diagram of a pixel circuit according to at least one embodiment of the present disclosure.

As shown in FIG. 5, on the basis of the at least one embodiment of the pixel circuit shown in FIG. 1, the pixel circuit according to the at least one embodiment of the present disclosure further comprises a data writing circuit 31, a first reset circuit 32 and a third reset circuit 34;

the data writing circuit 31 is electrically connected to the writing control terminal Xn, the data line DT and the second node N2 respectively, and is used for writing the data voltage Vdt on the data line DT into the second node N2 under the control of the writing control signal provided by the writing control terminal Xn;

the first reset circuit 32 is respectively electrically connected to the first reset control terminal R1, the reference voltage terminal VR and the second node N2 for writing the reference voltage Vref provided by the reference voltage terminal VR into the second node N2 under the control of the first reset control signal provided by the first reset control terminal R1;

the third reset circuit 34 is electrically connected to the third reset control terminal R3, the initial voltage terminal I1 and the first node N1, respectively, for writing the initial voltage Vinit provided by the initial voltage terminal I1 into the first node N1 under the control of the third reset control signal provided by the third reset control terminal R3.

In operation of at least one embodiment of the pixel circuit shown in FIG. 5 of the present disclosure, the display cycle may include a reset phase, a compensation phase, and a light-emitting phase arranged sequentially;

in a reset phase, the first reset circuit 32 writes a reference voltage Vref provided by a reference voltage terminal VR into the second node N2 under the control of a first reset control signal; the third reset circuit 34 writes the initial voltage Vinit provided by the initial voltage terminal I1 into the first node N1 under the control of the third reset control signal;

in a compensation phase, the data writing circuit 31 writes a data voltage Vdt on a data line DT into the second node N2 under the control of a writing control signal provided by the writing control terminal Xn, and the compensation control circuit controls the connection between the first node N1 and the driving node under the control of the compensation control signal;

in a light-emitting phase, the first reset circuit 32 writes the reference voltage Vref into the second node N2 under the control of the first reset control signal, and the light-emitting control circuit 13 controls connection between the driving node and a first electrode of the light-emitting element EL under the control of the light-emitting control signal; the driving circuit 11 drives the light-emitting element EL to emit light.

in at least one embodiment of the present disclosure, a power control circuit may be provided between the driving circuit 11 and the power supply voltage terminal VDD, the power control circuit controlling the connection or disconnection between the driving circuit 11 and the power supply voltage terminal VDD under the control of the potential of its control terminal.

Figure 6:
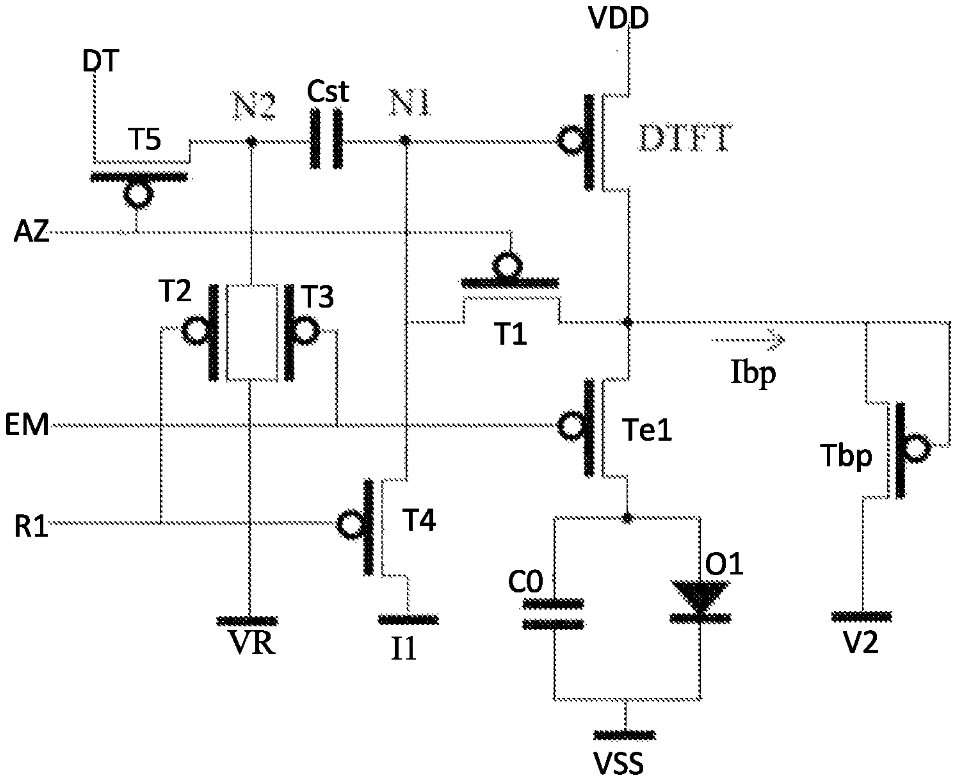
FIG. 6 is a circuit diagram of a pixel circuit according to at least one embodiment of the present disclosure.

As shown in FIG. 6, in at least one embodiment of the pixel circuit shown in FIG. 3, the light-emitting element is an organic light-emitting diode O1;

the discharging circuit comprises a discharging transistor Tbp;

a gate electrode of the discharging transistor Tbp and a source electrode of the discharging transistor Tbp are both electrically connected to the discharging current terminal, and a drain electrode of the discharging transistor Tbp is electrically connected to a second voltage terminal V2; the discharging current terminal is electrically connected to the driving node;

the light-emitting control circuit comprises a first light-emitting control transistor Te1;

a gate electrode of the first light-emitting control transistor Te1 is electrically connected to the light-emitting control terminal EM, the source electrode of the first light-emitting control transistor Te1 is electrically connected to the driving node, and the drain electrode of the first light-emitting control transistor Te1 is electrically connected to the anode of the organic light-emitting diode O1; the cathode of the organic light-emitting diode O1 is electrically connected to the low voltage terminal VSS;

the driving circuit comprises a driving transistor DTFT, and the compensation control circuit comprises a first transistor T1;

a gate electrode of the driving transistor DTFT is electrically connected to the first node N1, a source electrode of the driving transistor DTFT is electrically connected to the power supply voltage terminal VDD, and a drain electrode of the driving transistor DTFT is electrically connected to the driving node;

a gate electrode of the first transistor T1 is electrically connected to the compensation control terminal AZ, a source electrode of the first transistor T1 is electrically connected to the first node N1, and a drain electrode of the first transistor T1 is electrically connected to the driving node;

the storage circuit comprises a storage capacitor Cst, the first reset circuit comprises a second transistor T2, the second reset circuit comprises a third transistor T3, and the third reset circuit comprises a fourth transistor T4; the data writing circuit comprises a fifth transistor T5;

a first terminal of the storage capacitor Cst is electrically connected to the first node N1, and a second terminal of the storage capacitor Cst is electrically connected to a second node N2;

a gate electrode of the second transistor T2 is electrically connected to the first reset control terminal R1, the source electrode of the second transistor T2 is electrically connected to the reference voltage terminal VR, and the drain electrode of the second transistor T2 is electrically connected to the second node N2;

a gate electrode of the third transistor T3 is electrically connected to the light-emitting control terminal EM, a source electrode of the third transistor T3 is electrically connected to the reference voltage terminal VR, and a drain electrode of the third transistor T3 is electrically connected to the second node N2;

a gate electrode of the fourth transistor T4 is electrically connected to the first reset control terminal R1, the source electrode of the fourth transistor T4 is electrically connected to the initial voltage terminal I1, and the drain electrode of the fourth transistor T4 is electrically connected to the first node;

a gate electrode of the fifth transistor T5 is electrically connected to the compensation control terminal AZ, the source electrode of the fifth transistor T5 is electrically connected to the data line DT, and the drain electrode of the fifth transistor T5 is electrically connected to the second node N2.

In at least one embodiment of the pixel circuit shown in FIG. 6, the aspect ratio of the Tbp may be set to be larger than the aspect ratio of the DTFT, and the current value of the Ibp may be adjusted by setting the voltage value of the second voltage signal supplied from the second voltage terminal V2 so that the Ibp is larger than the characteristic-determinant uncontrolled current portion of the driving transistor, and the Ibp is set to be smaller than 1/100 of the maximum operating current of the driving transistor.

In FIG. 6, the junction capacitance across the organic light-emitting diode O1 is denoted as CO.

In at least one embodiment of the pixel circuit shown in FIG. 6, the second reset control terminal is a light-emitting control terminal, the third reset control terminal is a first reset control terminal, and the writing control terminal is a compensation control terminal.

In at least one embodiment of the pixel circuit shown in FIG. 6, all of the transistors are p-type transistors, but this is not limiting, and in actual operation, the transistors in at least one embodiment of the pixel circuit shown in FIG. 6 may also be n-type transistors.

In at least one embodiment of the pixel circuit shown in FIG. 6, the Tbp may be, but is not limited to, a LTPS transistor.

In at least one embodiment of the present disclosure, the voltage value of the second voltage signal provided by the second voltage terminal V2 may be approximately equal to, but is not limited to, the voltage value of the low voltage signal provided by the low voltage terminal VSS.

Figure 7:
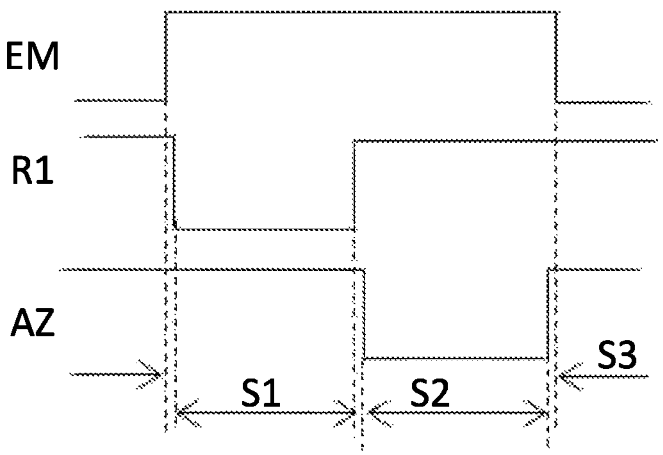
FIG. 7 is an operational timing diagram of at least one embodiment of the pixel circuit shown in FIG. 6.

As shown in FIG. 7, in operation of at least one embodiment of the pixel circuit shown in FIG. 6 of the present disclosure, the display cycle may include a reset phase S1, a compensation phase S2, and a light-emitting phase S3 arranged sequentially;

in a reset phase S1, EM provides a high voltage signal, R1 provides a low voltage signal, AZ provides a high voltage signal, and T2 and T4 are opened so as to write a reference voltage Vref provided by a reference voltage terminal VR into a second node N2 and write an initial voltage Vinit provided by an initial voltage terminal I1 into a first node N1; so that at the beginning of the compensation phase, the DTFT is able to conduct;

in the compensation phase S2, EM provides a high voltage signal, R1 provides a high voltage signal, AZ provides a low voltage signal, and T1 is opened and T5 is opened; a data line DT provides a data voltage Vdt to a second node N2; a first node N1 is in connection with a drain electrode of the DTFT, and at this time, the DTFT is in a diode connection state; the Tbp generates a discharging current Ibp and provides the discharging current Ibp via a discharging current terminal, and the discharging current terminal is electrically connected to a driving node; and a power supply voltage Vdd provided by a power supply voltage terminal VDD charges the Cst via a driving transistor, the potential of the first node N1 gradually increases, and Ids (Ids is a drain-source current flowing through the driving transistor) gradually decreases; when Ids is equal to the discharging current Ibp, the charging process terminals; since the driving transistor DTFT still has a residual current I0, the potential Vn1 of the first node N1 is not strictly equal to Vdd+Vth; since I0 is small, Vn1 is still close to Vth; and Vth is a threshold voltage of the driving transistor DTFT, according to the characteristics of the driving transistor DTFT:

$$Ids = K \times (Vgs - Vth)^2;$$

where K is a current coefficient of a driving transistor, and Vgs is a gate-source voltage of the driving transistor;

in the case where Vgs is equal to Vdd+Vth, Taylor expansion can be performed on the above equation, ignoring higher-order terms;

$$Ids = 2K(Vgs - Vth);$$

ideally, at the terminal of the charging process, the residual current I0 is equal to Ibp, then:

Vn1 is approximately equal to Vth+Ibp/2K;

where the additional term Ibp/2K is a voltage increment related to a discharging current Ibp acquired in the compensation phase, and it needs to be explained that the discharging current Ibp of the bypass discharge channel needs to be greater than the uncontrollable leakage part determined by the device characteristics of the driving transistor, so as to ensure that I0 covers these components;

in a light-emitting phase S3, EM provides a low voltage signal, R1 provides a high voltage signal, AZ provides a high voltage signal, T3 is on, Te1 is on, and DTFT drives O1 to emit light, and at this time, N2 is connected to a reference voltage Vref;

in a compensation phase S2, a second node N2 accesses a data voltage Vdt; in the light-emitting phase S3, the second node N2 accesses a reference voltage Vref; a voltage jump amplitude δVn2=Vref−Vdt of the second node N2 is coupled to the first node N1 by the storage circuit 10, and is superimposed on a potential Vn1 of the first node N1 at the terminal of the compensation phase S2 to form a gate-source voltage Vgs of a driving transistor; at this moment, at this moment, ids is approximately equal to 2K×(δVn2+Vn1−Vth), and Ids is equal to 2K×δVn2+Ibp;

where 2K×δVn2 is a target driving current component controlled by the Vdt, the residual current I0 is equal to Ibp, and I0 contains an uncontrolled current component related to the characteristics of the driving transistor; in the light-emitting phase S3, when the driving transistor drives the organic light-emitting diode O1 to emit light, this part of the uncontrolled current is exactly equal to the discharging current Ibp, and is discharged by the bypass discharge channel, and only the target driving current component 2K×δVn2 controlled by the Vdt drives the organic light-emitting diode O1 to emit light, especially when displaying with a low grayscale; when the driving transistor outputs a small driving current, the driving current is not caused to be disturbed by components such as uncontrolled leakage.

In operation of at least one embodiment of the pixel circuit shown in FIG. 6 of the present disclosure, when Te1 and T1 are LTPS transistors, the leakage Ioff1 of Te1 may affect the matching accuracy of Ibp with the residual current I0, and during the light-emitting phase, the leakage Ioff2 of T1 may also be added to the driving current, and the noise caused by the leakage of Te1 and T1 may not be discharged from the discharge channel. Although Ioff1 and Ioff2 can be reduced to some extent by operating point design, device property improvement, etc. setting Te1 and T1 as low-leakage devices, such as oxide TFT (oxide thin film transistors), is a safer solution.

In at least one embodiment of the present disclosure, Tbp is illustrated as a p-type transistor;

when the gate-source voltage of the Tbp is far greater than the threshold voltage of the Tbp, the Tbp is cut off, and the current flowing through the Tbp at this moment is a drain current Ioff;

when the gate-source voltage of the Tbp is greater than the threshold voltage of the Tbp, but is close to the threshold voltage of the Tbp, the current flowing through the Tbp changes rapidly as the gate-source voltage of the Tbp decreases, but the value is still small, and at this time, the current flowing through the Tbp becomes a sub-threshold current Isub;

when the gate-source voltage of the Tbp is less than the threshold voltage of the Tbp, but is close to the threshold voltage of the Tbp, the current flowing through the Tbp is controlled by the gate-source voltage of the Tbp, but is still small in value, and the current flowing through the Tbp is a weak on-current.

There are two factors that can affect the setting of the current through the Tbp in at least one embodiment of the present disclosure:

The first is the magnitude of the uncontrolled current of the DTFT (the uncontrolled current comprises off current or a sub-threshold current of the DTFT, etc.), and since the structural parameters of the DTFT are different from those of the Tbp, in order to ensure that the Ibp covers the uncontrolled current of the DTFT, it may correspond to a drain current Ioff of the Tbp, a sub-threshold current Isub of the Tbp or a weak on current, namely, all three cases are possible.

Since the compensation time of most pixel circuits is limited, the potential of the first node N1 at the terminal of the compensation phase cannot reach Vdd+Vth, the drain-source current flowing through the DTFT is still in a weak on state, and at this time, if the Ibp is too small, the instability of the drain-source current of the DTFT is easily covered. In at least one embodiment of the present disclosure, the Tbp can be controlled to be in a weak on state, but not limited thereto. In actual operation, the state of Tbp can be flexibly set according to the uncontrolled current of DTFT, and Tbp can also be in a cutoff state or in a sub-threshold region.

In at least one embodiment of the present disclosure, a discharging circuit (the discharging circuit comprising a discharging transistor Tbp) is electrically connected to the drain of the DTFT, so that during the compensation phase, when the VDD supplies DTFT and T1 is finished charging the Cst, the residual current I0 flowing through the DTFT is equal to Ibp, and so that during the light-emitting phase, an uncontrolled current is discharged by the bypass discharge channel when the driving transistor drives the organic light-emitting diode O1 to emit light. However, in the related art, the discharging current is electrically connected to the anode of O1 and can be discharged only during the light-emitting phase, so that the above-mentioned process cannot be completed.

Figure 8:
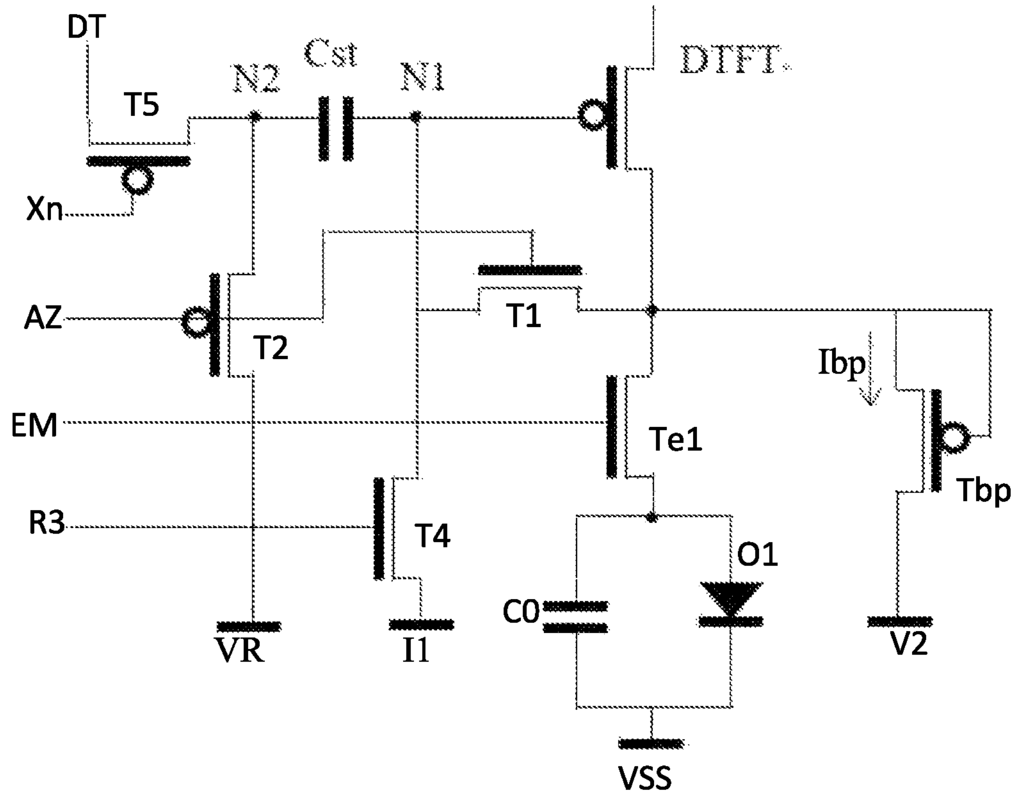
FIG. 8 is a circuit diagram of a pixel circuit according to at least one embodiment of the present disclosure.

As shown in FIG. 8, in at least one embodiment of the pixel circuit shown in FIG. 5, the light-emitting element is an organic light-emitting diode O1;

the discharging circuit comprises a discharging transistor Tbp;

a gate electrode of the discharging transistor Tbp and a source electrode of the discharging transistor Tbp are both electrically connected to the discharging current terminal, and a drain electrode of the discharging transistor Tbp is electrically connected to a second voltage terminal V2; the discharging current terminal is electrically connected to the driving node;

the light-emitting control circuit comprises a first light-emitting control transistor Te1;

a gate electrode of the first light-emitting control transistor Te1 is electrically connected to the light-emitting control terminal EM, the source electrode of the first light-emitting control transistor Te1 is electrically connected to the driving node, and the drain electrode of the first light-emitting control transistor Te1 is electrically connected to the anode of the organic light-emitting diode O1; the cathode of the organic light-emitting diode O1 is electrically connected to the low voltage terminal VSS;

the driving circuit comprises a driving transistor DTFT, and the compensation control circuit comprises a first transistor T1;

a gate electrode of the driving transistor DTFT is electrically connected to the first node N1, a source electrode of the driving transistor DTFT is electrically connected to the power supply voltage terminal VDD, and a drain electrode of the driving transistor DTFT is electrically connected to the driving node;

a gate electrode of the first transistor T1 is electrically connected to the compensation control terminal AZ, a source electrode of the first transistor T1 is electrically connected to the first node N1, and a drain electrode of the first transistor T1 is electrically connected to the driving node;

the storage circuit comprises a storage capacitor Cst, the first reset circuit comprises a second transistor T2, and the third reset circuit comprises a fourth transistor T4; the data writing circuit comprises a fifth transistor T5;

a first terminal of the storage capacitor Cst is electrically connected to the first node N1, and a second terminal of the storage capacitor Cst is electrically connected to a second node N2;

a gate electrode of the second transistor T2 is electrically connected to the compensation control terminal AZ, a source electrode of the second transistor T2 is electrically connected to the reference voltage terminal VR, and a drain electrode of the second transistor T2 is electrically connected to the second node N2;

a gate electrode of the fourth transistor T4 is electrically connected to the third reset control terminal R3, the source electrode of the fourth transistor T4 is electrically connected to the initial voltage terminal I1, and the drain electrode of the fourth transistor T4 is electrically connected to the first node;

a gate electrode of the fifth transistor T5 is electrically connected to the writing control terminal Xn, the source electrode of the fifth transistor T5 is electrically connected to the data line DT, and the drain electrode of the fifth transistor T5 is electrically connected to the second node N2.

In FIG. 8, reference numeral CO denotes the junction capacitance across the organic light emitting diode O1.

In at least one embodiment of the driving circuit shown in FIG. 8, the first reset control terminal is a compensation control terminal.

In at least one embodiment of the driving circuit shown in FIG. 8, Te1 and T1 are n-type transistors and Te1 and T1 are oxide transistors to reduce leakage.

In at least one embodiment of the driving circuit shown in FIG. 8, T4 is an n-type transistor and T4 is an oxide transistor, but this is not limiting.

In at least one embodiment of the driving circuit shown in FIG. 8, Te1, T1 and T4 are provided as oxide transistors for the purpose of: to ensure that the uncontrolled current of DTFT and the matching of Ibp are not disturbed by the drain current of Te1, the drain current of T1 and the drain current of T4 during the compensation phase and the light-emitting phase.

Figure 9:
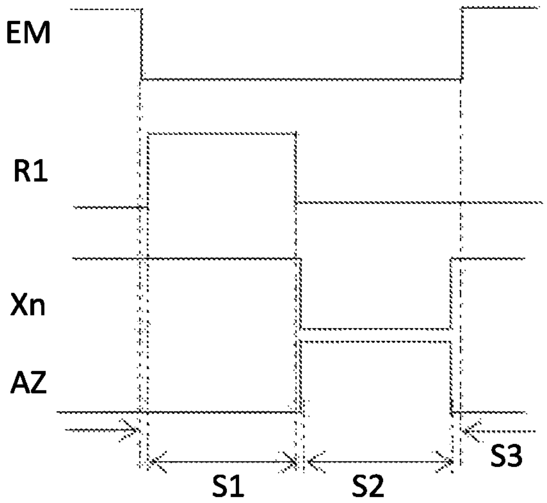
FIG. 9 is an operational timing diagram of at least one embodiment of the pixel circuit shown in FIG. 8.

As shown in FIG. 9, in operation of at least one embodiment of the pixel circuit shown in FIG. 8 of the present disclosure, the display cycle comprises a reset phase S1, a compensation phase S2 and a light-emitting phase S3 which are arranged successively;

in a reset phase S1, EM provides a low voltage signal, R3 provides a high voltage signal, AZ provides a low voltage signal, and T2 is opened and T4 is opened so as to write a reference voltage Vref provided by a reference voltage terminal VR into a second node N2 and write an initial voltage Vinit provided by an initial voltage terminal I1 into a first node N1; so that at the beginning of the compensation phase, the DTFT is able to conduct;

in a compensation phase S2, EM provides a low voltage signal, R3 provides a low voltage signal, AZ provides a high voltage signal, T1 is opened, and T5 is opened; a data line DT provides a data voltage Vdt to a second node N2; a first node N1 is in connection with a drain electrode of the DTFT, and at this time, the DTFT is in a diode connection state; the Thp generates a discharging current Ibp, and provides the discharging current Ibp via a discharging current terminal, and the discharging current terminal is electrically connected to a driving node; and a power supply voltage Vdd provided by a power supply voltage terminal VDD charges the Cst via a driving transistor, the potential of the first node N1 gradually increases, and Ids (Ids is a drain-source current flowing through the driving transistor) gradually decreases; when Ids is equal to the discharging current Ibp, the charging process terminals; since the driving transistor DTFT still has a residual current I0, the potential Vn1 of the first node N1 is not strictly equal to Vdd+Vth; since I0 is small, Vn1 is still close to Vth; and Vth is a threshold voltage of the driving transistor DTFT, according to the characteristics of the driving transistor DTFT:

$$Ids = K \times (Vgs - Vth)^2;$$

where K is a current coefficient of a driving transistor, and Vgs is a gate-source voltage of the driving transistor;

in the case where Vgs is equal to Vdd+Vth, Taylor expansion can be performed on the above equation, ignoring higher-order terms;

$$Ids = 2K(Vgs - Vth);$$

ideally, at the terminal of the charging process, the residual current I0 is equal to Ibp, then:

Vn1 is approximately equal to Vth+Ibp/2K;

where the additional term Ibp/2K is a voltage increment related to a discharging current Ibp acquired in the compensation phase, and it needs to be explained that the discharging current Ibp of the bypass discharge channel needs to be greater than the uncontrollable leakage part determined by the device characteristics of the driving transistor, so as to ensure that I0 covers these components;

in a light-emitting phase S3, EM provides a high voltage signal, R3 provides a high voltage signal, AZ provides a low voltage signal, T2 is on, Te1 is on, and DTFT drives O1 to emit light, and at this time, N2 is connected to a reference voltage Vref;

in a compensation phase S2, a second node N2 accesses a data voltage Vdt; in the light-emitting phase S3, the second node N2 accesses a reference voltage Vref; a voltage jump amplitude δVn2=Vref−Vdt of the second node N2 is coupled to the first node N1 by the storage circuit 10, and is superimposed on a potential Vn1 of the first node N1 at the terminal of the compensation phase S2 to form a gate-source voltage Vgs of a driving transistor; at this moment, at this moment, ids is approximately equal to 2K×(δVn2+Vn1−Vth), and Ids is equal to 2K×δVn2+Ibp;

where 2K×δVn2 is a target driving current component controlled by the Vdt, the residual current I0 is equal to Ibp, and I0 contains an uncontrolled current component related to the characteristics of the driving transistor; in the light-emitting phase S3, when the driving transistor drives the organic light-emitting diode O1 to emit light, this part of the uncontrolled current is exactly equal to the discharging current Ibp, and is discharged by the bypass discharge channel; and only the target driving current component 2K×δVn2 controlled by the Vdt drives the organic light-emitting diode O1 to emit light.

In at least one embodiment of the driving circuit shown in FIG. 9, Te1 and T1 are n-type transistors and Te1 and T1 are oxide transistors. Since the leakage current of the oxide transistors is relatively small, it is possible to reduce the influence of the leakage current due to Te1 and T1 on the driving current without affecting the display.

Figure 10:
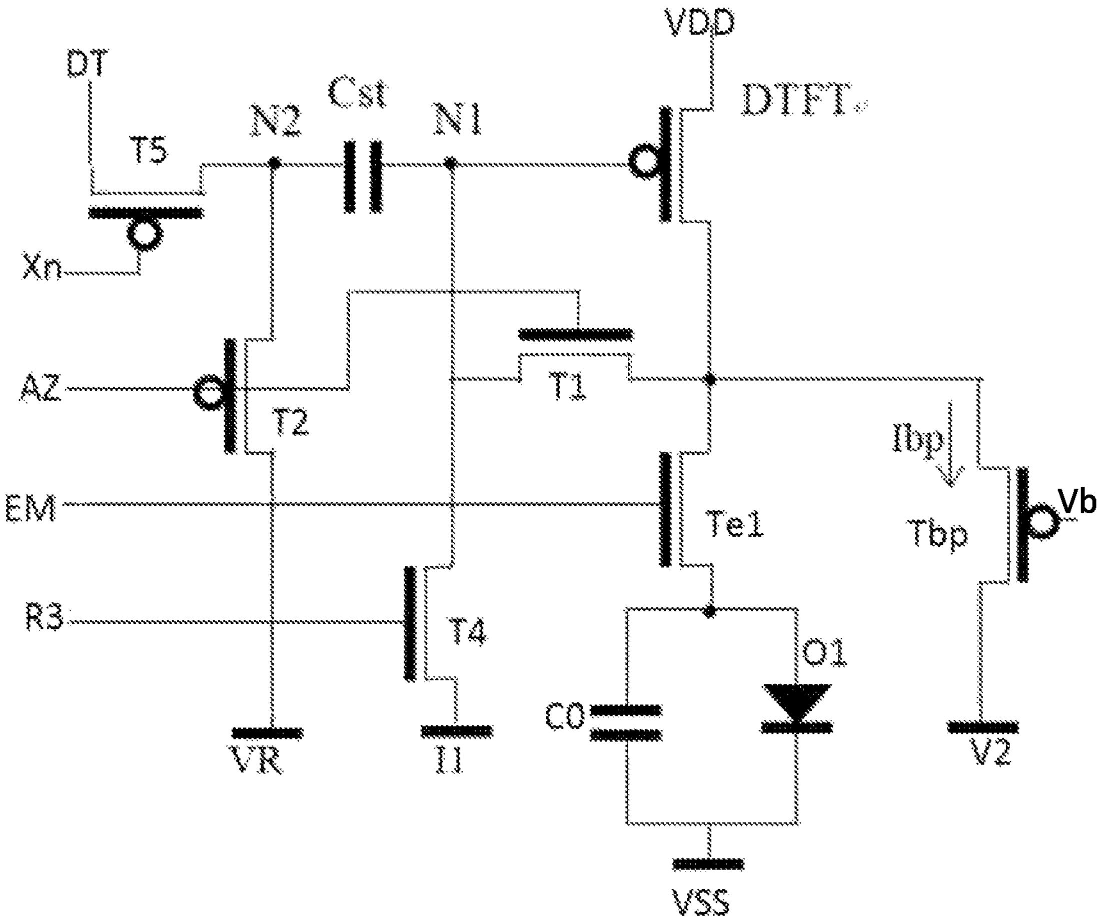
FIG. 10 is a circuit diagram of a pixel circuit according to at least one embodiment of the present disclosure.

At least one embodiment of the driving circuit shown in FIG. 10 of the present disclosure differs from at least one embodiment of the driving circuit shown in FIG. 8 of the present disclosure in that:

The gate electrode of the Tbp is electrically connected to the control voltage terminal Vb.

In operation of at least one embodiment of the driving circuit of FIG. 10 of the present disclosure, the magnitude of the discharging current Ibp may be adjusted to some extent by the control voltage provided at the control voltage terminal Vb and the second voltage signal provided at the second voltage terminal V2.

Figure 11:
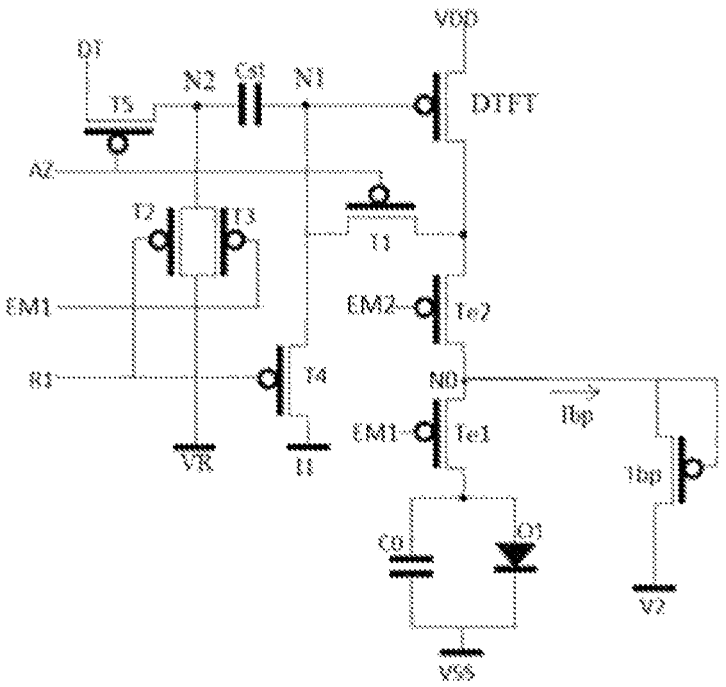
FIG. 11 is a circuit diagram of a pixel circuit according to at least one embodiment of the present disclosure.

As shown in FIG. 11, in at least one embodiment of the pixel circuit shown in FIG. 4, the light-emitting element is an organic light-emitting diode O1;

the discharging circuit comprises a discharging transistor Tbp;

a gate electrode of the discharging transistor Tbp and a source electrode of the discharging transistor Tbp are both electrically connected to the discharging current terminal, and a drain electrode of the discharging transistor Tbp is electrically connected to a second voltage terminal V2; the discharging current terminal is electrically connected to the intermediate node NO;

the first control sub-circuit comprises a first light-emitting control transistor Te1, and the second control sub-circuit comprises a second light-emitting control transistor Te2;

a gate electrode of the first light-emitting control transistor Te1 is electrically connected to the first light-emitting control terminal EM1, the source electrode of the first light-emitting control transistor Te1 is electrically connected to the intermediate node NO, and the drain electrode of the first light-emitting control transistor Te1 is electrically connected to the anode of the organic light-emitting diode O1; the cathode of the organic light-emitting diode O1 is electrically connected to the low voltage terminal VSS;

a gate electrode of the second light-emitting control transistor Te2 is electrically connected to a second light-emitting control terminal EM2, a source electrode of the second light-emitting control transistor Te2 is electrically connected to the driving node, and a drain electrode of the second light-emitting control transistor Te2 is electrically connected to the intermediate node NO;

the driving circuit comprises a driving transistor DTFT, and the compensation control circuit comprises a first transistor T1;

a gate electrode of the driving transistor DTFT is electrically connected to the first node N1, a source electrode of the driving transistor DTFT is electrically connected to the power supply voltage terminal VDD, and a drain electrode of the driving transistor DTFT is electrically connected to the driving node;

a gate electrode of the first transistor T1 is electrically connected to the compensation control terminal AZ, a source electrode of the first transistor T1 is electrically connected to the first node N1, and a drain electrode of the first transistor T1 is electrically connected to the driving node;

the storage circuit comprises a storage capacitor Cst, the first reset circuit comprises a second transistor T2, the second reset circuit comprises a third transistor T3, and the third reset circuit comprises a fourth transistor T4; the data writing circuit comprises a fifth transistor T5;

a first terminal of the storage capacitor Cst is electrically connected to the first node N1, and a second terminal of the storage capacitor Cst is electrically connected to a second node N2;

a gate electrode of the second transistor T2 is electrically connected to the first reset control terminal R1, the source electrode of the second transistor T2 is electrically connected to the reference voltage terminal VR, and the drain electrode of the second transistor T2 is electrically connected to the second node N2;

a gate electrode of the third transistor T3 is electrically connected to the first light-emitting control terminal EM1, the source electrode of the third transistor T3 is electrically connected to the reference voltage terminal VR, and the drain electrode of the third transistor T3 is electrically connected to the second node N2;

a gate electrode of the fourth transistor T4 is electrically connected to the first reset control terminal R1, the source electrode of the fourth transistor T4 is electrically connected to the initial voltage terminal I1, and the drain electrode of the fourth transistor T4 is electrically connected to the first node;

a gate electrode of the fifth transistor T5 is electrically connected to the compensation control terminal AZ, the source electrode of the fifth transistor T5 is electrically connected to the data line DT, and the drain electrode of the fifth transistor T5 is electrically connected to the second node N2.

In FIG. 11, the junction capacitance across the organic light emitting diode O1 is denoted by reference numeral CO.

In at least one embodiment of the pixel circuit shown in FIG. 11, all of the transistors are p-type transistors, but this is not limiting. In particular implementations, Te1, Te2, and T1 may be n-type transistors, and Te1, Te2, and T1 may be oxide transistors.

Figure 12:
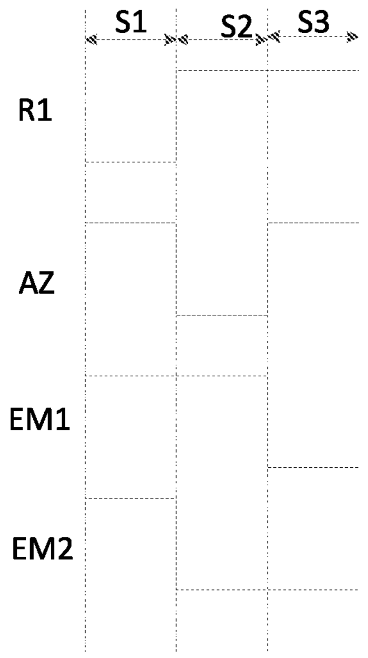
FIG. 12 is an operational timing diagram of at least one embodiment of the pixel circuit shown in FIG. 11.

As shown in FIG. 12, in operation of at least one embodiment of the pixel circuit shown in FIG. 11 of the present disclosure, the display cycle includes a reset phase S1, a compensation phase S2, and a light-emitting phase S3 arranged sequentially;

in a reset phase S1, R1 provides a low voltage signal, and T2 and T3 are opened; a reference voltage Vref provided by a reference voltage terminal VR is written into a second node N2, and an initial voltage Vinit provided by an initial voltage terminal I1 is written into a first node N1, so that at the beginning of a compensation phase, DTFT can be conducted;

in a reset phase S1, AZ providing a high voltage signal, and both EM1 and EM2 providing a high voltage signal;

in a compensation phase S2, AZ provides a low voltage signal, EM2 provides a low voltage signal, T1, T5 and Te2 are in connection, a data line DT provides a data voltage Vdt to a second node N2, a drain electrode of the DTFT is in connection with the first node N1, and a discharging current Ibp is connected to the drain electrode of the DTFT; EM1 and R1 provide a high voltage signal;

in the light-emitting phase S3, AZ provides a high voltage signal, EM1 and EM2 provide a low voltage signal, R1 provides a high voltage signal, T3 is on to write Vref to the second node N2, Te1 and Te2 are on, and DTFT drives O1 to emit light.

A pixel driving method according to an embodiment of the present disclosure, which is applied to the above-mentioned pixel circuit, wherein the display cycle comprises a compensation phase and a light-emitting phase arranged successively; the pixel driving method comprises:

in the compensation phase, the discharging circuit generates the discharging current and provides the discharging current through the discharging current terminal, and the compensation control circuit controls connection between the first node and the driving node under the control of the compensation control signal, and the discharging current terminal is connected to the driving node; and in the light-emitting phase, the discharging circuit generates the discharging current and provides the discharging current through the discharging current terminal, wherein the discharging current terminal is connected to the driving node and the first electrode of the light-emitting element, the light-emitting control circuit controls connection between the driving node and the first electrode of the light-emitting element under control of the light-emitting control signal, and the driving circuit controls generation of the driving current for driving the light-emitting element under control of the potential of the first node.

Optionally, the pixel circuit further comprises a data writing circuit, a first reset circuit, a second reset circuit and a third reset circuit; the display cycle further comprises a reset phase arranged before the compensation phase, and the pixel driving method further comprises:

in the reset phase, the first reset circuit writes the reference voltage provided by the reference voltage terminal into the second node under control of the first reset control signal; the third reset circuit writes the initial voltage provided by the initial voltage terminal into the first node under control of the third reset control signal;

in the compensation phase, the data writing circuit writes the data voltage on the data line into the second node under control of the writing control signal;

in the light-emitting phase, the second reset circuit writes the reference voltage to the second node under control of the second reset control signal.

Optionally, the pixel circuit further comprises a data writing circuit, a first reset circuit and a third reset circuit; the display cycle further comprises a reset phase arranged before the compensation phase, and the pixel driving method further comprises:

in the reset phase, the first reset circuit writes the reference voltage provided by the reference voltage terminal into the second node under control of the first reset control signal; the third reset circuit writes the initial voltage provided by the initial voltage terminal into the first node under control of the third reset control signal;

in the compensation phase, the data writing circuit writes the data voltage on the data line into the second node under control of the writing control signal;

in the light-emitting phase, the first reset circuit writes the reference voltage to the second node under control of the first reset control signal.

The display device described in this embodiment includes the pixel circuit described above.

While the foregoing is directed to the preferred embodiments of the present disclosure, it will be understood by those skilled in the art that numerous modifications and adaptations may be made without departing from the principles of the disclosure, and such modifications and adaptations are intended to be within the scope of the disclosure.

What is claimed is:

1. A pixel circuit, comprising: a light-emitting element, a driving circuit, a compensation control circuit, a light-emitting control circuit and a discharging circuit;

a control terminal of the driving circuit is electrically connected to a first node, a first terminal of the driving circuit is electrically connected to a power supply voltage terminal, a second terminal of the driving circuit is electrically connected to a driving node, and the driving circuit is used for controlling generation of a driving current under control of a potential of the first node;

the compensation control circuit is electrically connected to a compensation control terminal, the first node and the driving node for controlling connection or disconnection between the first node and the driving node under control of a compensation control signal provided by the compensation control terminal;

the light-emitting control circuit is electrically connected to a light-emitting control terminal, the driving node and a first electrode of the light-emitting element for controlling connection or disconnection between the driving node and the first electrode of the light-emitting element under control of a light-emitting control signal provided by the light-emitting control terminal; a second electrode of the light-emitting element is electrically connected to a first voltage terminal;

the discharging circuit is used for generating a discharging current and providing the discharging current through a discharging current terminal;

in a compensation phase, the discharging current terminal is connected to the driving node, and in a light-emitting phase, the discharging current terminal is connected to the driving node and the first electrode of the light-emitting element, and the discharging current terminal is not directly electrically connected to the first electrode of the light-emitting element.

2. The pixel circuit according to claim 1, wherein the discharging current terminal is electrically connected to the driving node.

3. The pixel circuit according to claim 1, wherein the light-emitting control circuit comprises a first control sub-circuit and a second control sub-circuit; the light-emitting control terminal comprises a first light-emitting control terminal and a second light-emitting control terminal;

the first control sub-circuit is electrically connected to the first light-emitting control terminal, and an intermediate node is electrically connected to the first electrode of the light-emitting element for controlling connection or disconnection between the intermediate node and the first electrode of the light-emitting element under control of a first light-emitting control signal provided by the first light-emitting control terminal;

the second control sub-circuit is electrically connected to a second light-emitting control terminal, the driving node and the intermediate node for controlling connection or disconnection between the driving node and the intermediate node under control of a second light-emitting control signal provided by the second light-emitting control terminal;

the discharging current terminal is electrically connected to the intermediate node.

4. The pixel circuit according to claim 3, wherein the first control sub-circuit is used for controlling connection between the driving node and the intermediate node under control of the first light-emitting control signal provided by the first light-emitting control terminal in the compensation phase and the light-emitting phase;

the second control sub-circuit is used for controlling, in the compensation phase, disconnection between the intermediate node and the first electrode of the light-emitting element under control of the second light-emitting control signal provided at the second light-emitting control terminal, and controlling, in the light-emitting phase, connection between the intermediate node and the first electrode of the light-emitting element at the control terminal of the second light-emitting control signal.

5. The pixel circuit according to claim 1, wherein the discharging circuit comprises a discharging transistor;

a gate electrode of the discharging transistor and a first electrode of the discharging transistor are both electrically connected to the discharging current terminal, and a second electrode of the discharging transistor is electrically connected to a second voltage terminal.

6. The pixel circuit according to claim 1, wherein the discharging circuit comprises a discharging transistor;

a gate electrode of the discharging transistor is electrically connected to a discharging control terminal, a first electrode of the discharging transistor is electrically connected to the discharging current terminal, and a second electrode of the discharging transistor is electrically connected to a second voltage terminal.

7. The pixel circuit according to claim 1, wherein the light-emitting control circuit comprises a first light-emitting control transistor;

a gate electrode of the first light-emitting control transistor is electrically connected to the light-emitting control terminal, a first electrode of the first light-emitting control transistor is electrically connected to the driving node, and a second electrode of the first light-emitting control transistor is electrically connected to the first electrode of the light-emitting element.

8. The pixel circuit according to claim 7, wherein the first light-emitting control transistor is an oxide transistor.

9. The pixel circuit according to claim 3, wherein the first control sub-circuit comprises a first light-emitting control transistor, and the second control sub-circuit comprises a second light-emitting control transistor;

a gate electrode of the first light-emitting control transistor is electrically connected to the first light-emitting control terminal, a first electrode of the first light-emitting control transistor is electrically connected to the intermediate node, and a second electrode of the first light-emitting control transistor is electrically connected to the first electrode of the light-emitting element;

a gate electrode of the second light-emitting control transistor is electrically connected to a second light-emitting control terminal, a first electrode of the second light-emitting control transistor is electrically connected to the driving node, and a second electrode of the second light-emitting control transistor is electrically connected to the intermediate node.

10. The pixel circuit according to claim 9, wherein the first light-emitting control transistor and the second light-emitting control transistor are oxide transistors.

11. The pixel circuit according to claim 1, wherein the driving circuit comprises a driving transistor, and the compensation control circuit comprises a first transistor;

a gate electrode of the driving transistor is electrically connected to the first node, a first electrode of the driving transistor is electrically connected to the power supply voltage terminal, and a second electrode of the driving transistor is electrically connected to the driving node;

a gate electrode of the first transistor is electrically connected to the compensation control terminal, a first electrode of the first transistor is electrically connected to the first node, and a second electrode of the first transistor is electrically connected to the driving node.

12. The pixel circuit according to claim 11, wherein the first transistor is an oxide transistor.

13. The pixel circuit according to claim 1, further comprising a storage circuit;

a first terminal of the storage circuit is electrically connected to the first node, and a second terminal of the storage circuit is electrically connected to a second node.

14. The pixel circuit according to claim 13, further comprising a data writing circuit, a first reset circuit, a second reset circuit and a third reset circuit;

the data writing circuit is electrically connected to a writing control terminal, a data line and the second node for writing a data voltage on the data line into the second node under control of a writing control signal provided by the writing control terminal;

the first reset circuit is electrically connected to a first reset control terminal, a reference voltage terminal and the second node for writing a reference voltage provided by the reference voltage terminal into the second node under control of a first reset control signal provided by the first reset control terminal;

the second reset circuit is electrically connected to a second reset control terminal, the reference voltage terminal and the second node for writing the reference voltage into the second node under control of a second reset control signal provided by the second reset control terminal;

the third reset circuit is electrically connected to a third reset control terminal, an initial voltage terminal and the first node for writing an initial voltage provided by the initial voltage terminal into the first node under control of a third reset control signal provided by the third reset control terminal.

15. The pixel circuit according to claim 14, wherein the storage circuit comprises a storage capacitor, the first reset circuit comprises a second transistor, the second reset circuit comprises a third transistor, the third reset circuit comprises a fourth transistor, and the data writing circuit comprises a fifth transistor;

a first terminal of the storage capacitor is electrically connected to the first node, and a second terminal of the storage capacitor is electrically connected to the second node;

a gate electrode of the second transistor is electrically connected to the first reset control terminal, a first electrode of the second transistor is electrically connected to the reference voltage terminal, and a second electrode of the second transistor is electrically connected to the second node;

a gate electrode of the third transistor is electrically connected to the second reset control terminal, a first electrode of the third transistor is electrically connected to the reference voltage terminal, and a second electrode of the third transistor is electrically connected to the second node;

a gate electrode of the fourth transistor is electrically connected to the third reset control terminal, a first electrode of the fourth transistor is electrically connected to the initial voltage terminal, and a second electrode of the fourth transistor is electrically connected to the first node;

a gate electrode of the fifth transistor is electrically connected to the writing control terminal, a first electrode of the fifth transistor is electrically connected to the data line, and a second electrode of the fifth transistor is electrically connected to the second node.

16. The pixel circuit according to claim 13, further comprising a data writing circuit, a first reset circuit and a third reset circuit;

the data writing circuit is electrically connected to a writing control terminal, a data line and the second node for writing a data voltage on the data line into the second node under control of a writing control signal provided by the writing control terminal;

the first reset circuit is electrically connected to a first reset control terminal, a reference voltage terminal and the second node for writing a reference voltage provided by the reference voltage terminal into the second node under control of a first reset control signal provided by the first reset control terminal;

the third reset circuit is electrically connected to a third reset control terminal, an initial voltage terminal and the first node for writing an initial voltage provided by the initial voltage terminal into the first node under control of a third reset control signal provided by the third reset control terminal.

17. The pixel circuit according to claim 16, wherein the storage circuit comprises a storage capacitor, the first reset circuit comprises a second transistor, the third reset circuit comprises a fourth transistor, and the data writing circuit comprises a fifth transistor;

a first terminal of the storage capacitor is electrically connected to the first node, and a second terminal of the storage capacitor is electrically connected to the second node;

a gate electrode of the second transistor is electrically connected to the first reset control terminal, a first electrode of the second transistor is electrically connected to the reference voltage terminal, and a second electrode of the second transistor is electrically connected to the second node;

a gate electrode of the fourth transistor is electrically connected to the third reset control terminal, a first electrode of the fourth transistor is electrically connected to the initial voltage terminal, and a second electrode of the fourth transistor is electrically connected to the first node;

a gate electrode of the fifth transistor is electrically connected to the writing control terminal, a first electrode of the fifth transistor is electrically connected to the data line, and a second electrode of the fifth transistor is electrically connected to the second node.

18. A pixel driving method, applied to the pixel circuit as claimed in claim 1, wherein a display cycle comprises a compensation phase and a light-emitting phase which are arranged successively; the pixel driving method comprises:

in the compensation phase, the discharging circuit generates the discharging current and provides the discharging current through the discharging current terminal, and the compensation control circuit controls connection between the first node and the driving node under the control of the compensation control signal, and the discharging current terminal is connected to the driving node; and in the light-emitting phase, the discharging circuit generates the discharging current and provides the discharging current through the discharging current terminal, wherein the discharging current terminal is connected to the driving node and the first electrode of the light-emitting element, the light-emitting control circuit controls connection between the driving node and the first electrode of the light-emitting element under control of the light-emitting control signal, and the driving circuit controls generation of the driving current for driving the light-emitting element under control of the potential of the first node.

19. The pixel driving method according to claim 18, wherein the pixel circuit further comprises a data writing circuit, a first reset circuit, a second reset circuit and a third reset circuit; the display cycle further comprises a reset phase arranged before the compensation phase, and the pixel driving method further comprises:

in the reset phase, the first reset circuit writes the reference voltage provided by the reference voltage terminal into the second node under control of the first reset control signal; the third reset circuit writes the initial voltage provided by the initial voltage terminal into the first node under control of the third reset control signal;

in the compensation phase, the data writing circuit writes the data voltage on the data line into the second node under control of the writing control signal;

in the light-emitting phase, the second reset circuit writes the reference voltage to the second node under control of the second reset control signal.

20. A display device comprising the pixel circuit of claim 1.

* * * * *